US010534455B2

(12) United States Patent
Staudenmaier et al.

(10) Patent No.: US 10,534,455 B2
(45) Date of Patent: Jan. 14, 2020

(54) VISUAL DISPLAY CONTENT SOURCE IDENTIFIER AND METHOD

(71) Applicants: Michael Staudenmaier, Munich (DE); Vincent Aubineau, Gif sur Yvette (FR); Daniele Dall' Acqua, Monteciccardo (IT)

(72) Inventors: Michael Staudenmaier, Munich (DE); Vincent Aubineau, Gif sur Yvette (FR); Daniele Dall' Acqua, Monteciccardo (IT)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 14/897,714

(22) PCT Filed: Jun. 19, 2013

(86) PCT No.: PCT/IB2013/001449
§ 371 (c)(1),
(2) Date: Dec. 11, 2015

(87) PCT Pub. No.: WO2014/203021
PCT Pub. Date: Dec. 24, 2014

(65) Prior Publication Data
US 2016/0117007 A1    Apr. 28, 2016

(51) Int. Cl.
*G06F 3/041* (2006.01)
*G06T 1/60* (2006.01)
*G06T 11/60* (2006.01)

(52) U.S. Cl.
CPC ............. *G06F 3/041* (2013.01); *G06T 1/60* (2013.01); *G06T 11/60* (2013.01)

(58) Field of Classification Search
CPC ... G06F 3/041; G06F 3/14; G06T 1/60; G06T 11/60; G09G 5/026; G09G 5/06
USPC ........................................................ 345/629
See application file for complete search history.

(56) References Cited

U.S. PATENT DOCUMENTS

| 7,567,222 | B2 * | 7/2009 | Tanaka ................... B60K 35/00 345/173 |
| 2001/0014175 | A1 * | 8/2001 | Tavor .................... G06T 11/001 382/167 |
| 2003/0156097 | A1 * | 8/2003 | Kakihara ........... G01C 21/3667 345/156 |

(Continued)

FOREIGN PATENT DOCUMENTS

| JP | 2011259175 | 12/2011 |
| KR | 100820016 | 4/2008 |
| KR | 20120035373 | 4/2012 |

OTHER PUBLICATIONS

International Search Report and Written Opinion correlating to PCT/IB2013/001449 dated Mar. 31, 2014.

*Primary Examiner* — Michael Le (57) ABSTRACT

The invention provides an apparatus and method which allows identification of the system which provided images for each pixel of a touchscreen display which displays merged images of arbitrary shapes supplied from a plurality of systems. It further allows routing of user inputs to the appropriate system for further processing. Colour keying may be used to superimpose one image onto another. The invention finds particular application in the automotive field where images produced by an infotainment system may be merged with those produced by a mobile phone onto the in-vehicle display screen.

17 Claims, 4 Drawing Sheets

(56) References Cited

U.S. PATENT DOCUMENTS

| | | | |
|---|---|---|---|
| 2005/0055154 A1* | 3/2005 | Tanaka | G01C 21/36 |
| | | | 701/400 |
| 2006/0066507 A1* | 3/2006 | Yanagisawa | B60K 35/00 |
| | | | 345/7 |
| 2006/0287787 A1 | 12/2006 | Engstrom et al. | |
| 2011/0298599 A1* | 12/2011 | Oonishi | B60K 35/00 |
| | | | 340/425.5 |
| 2012/0327106 A1 | 12/2012 | Won et al. | |
| 2013/0016209 A1 | 1/2013 | Taylor et al. | |
| 2013/0050271 A1 | 2/2013 | Kim et al. | |
| 2013/0229489 A1* | 9/2013 | Ozawa | H04N 13/0059 |
| | | | 348/43 |
| 2013/0257738 A1* | 10/2013 | Tanaka | G05B 19/409 |
| | | | 345/168 |

\* cited by examiner

VISUAL DISPLAY CONTENT SOURCE IDENTIFIER AND METHOD

FIELD OF THE INVENTION

This invention relates to a visual display content source identifier and a method for identifying a content source of a visual display and has particular, though not exclusive, application to displays in automotive vehicles.

BACKGROUND OF THE INVENTION

Many current automotive vehicles are provided with visual displays for presenting information to the driver or passengers. Usually such displays are built into the infotainment systems or the instrument cluster. The graphical content of these displays is usually generated by a controller which also handles user inputs to the system. Generally, the controller contains at least a CPU (central processing unit) and a GPU (graphic processing unit). Often there is memory connected to or integrated with the controller. The memories can either be volatile memory or permanent storage type. US 20130016209 A1 discloses a vehicle display which can display a video image captured by an on-board camera or a map downloaded from a remote service centre for navigational purposes or written instructions for following a particular route to a desired destination. US 20130050271 A1 discloses a vehicle display apparatus which displays the same information displayed by a screen of a portable terminal, for example, a mobile phone, while the portable terminal is temporarily coupled to in-vehicle apparatus. Both the portable terminal's display screen and the vehicle's display screen may be touch sensitive panels or "touchscreen" panels. Touchscreen panels are well known, one of the most common types being the capacitive touchscreen comprising an insulator (for example, glass) coated with a transparent conductor. Touching of the screen's surface by a human finger (which is slightly electrically conducting) results in a distortion of the screen's electrostatic field, measurable as a change in capacitance. Various technologies may be employed to determine the location of the fingers contact point. Some touchscreens may also react to movement of the finger across of the screen so that, for example an image of a map may be moved across the screen to the left or right or up and down. US 20120327106 A1 discloses a touchscreen display which is partitioned into two regions. The same image (or "graphic content") may be displayed on each region but with a different orientation. For example one may be the mirror image of the other. A general problem with graphic content from different sources is to associate the graphic content with the source which provided it. In the case of the touchscreen, the touch position refers to a specific graphic content displayed on the screen. Such graphic content may be for example a representation of a button (a soft key). The user interaction usually has to be handled by the system which generated this content. Therefore, an association of user inputs to the source of the graphic content has to be provided. While this is a rather trivial task when the different sources allocate clear rectangular areas on the screen, in the case where images from sources are merged, determining the source of the graphic content at any particular location on the screen is no longer so trivial. One known method for merging images from two different sources employs the concept of colour keying. This is a technique which is often used in the broadcasting industry for superimposing one video image onto another. A colour or colour range of an overlaid image is made transparent revealing another image behind it. Usually a (monochrome) background of the overlaid image is "keyed out" so that the subject of the overlaid image may be superimposed onto a different background. US 20010014175 A1 describes such a method.

SUMMARY OF THE INVENTION

The present invention provides a visual display content identifier, a method, vehicle and computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
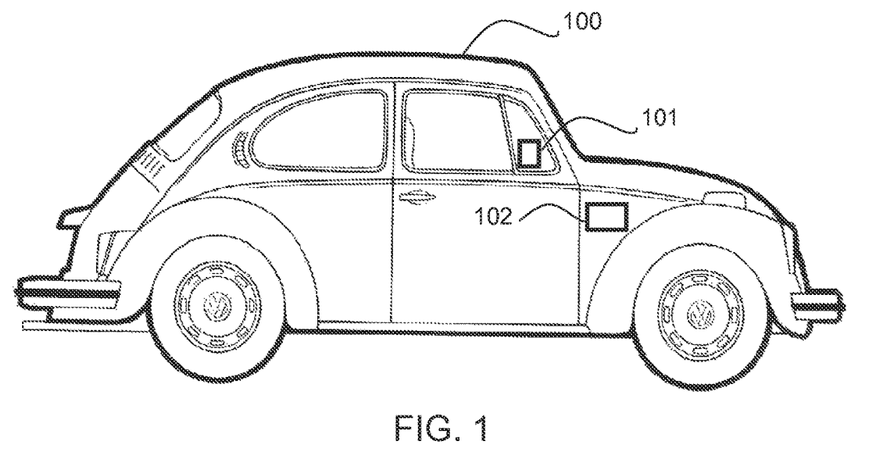
FIG. 1 schematically shows a motor vehicle including a visual display and including an example of apparatus for identifying the content source of the visual display.

With reference to FIG. 1, a vehicle 100 includes a visual display unit 101 which may form part of an infotainment system (not shown) of the vehicle. Apparatus 102 for driving the visual display unit 101 and for identifying a visual display content source may also be mounted in the vehicle 100 and will be described in greater detail below with reference to FIG. 2

Figure 2:
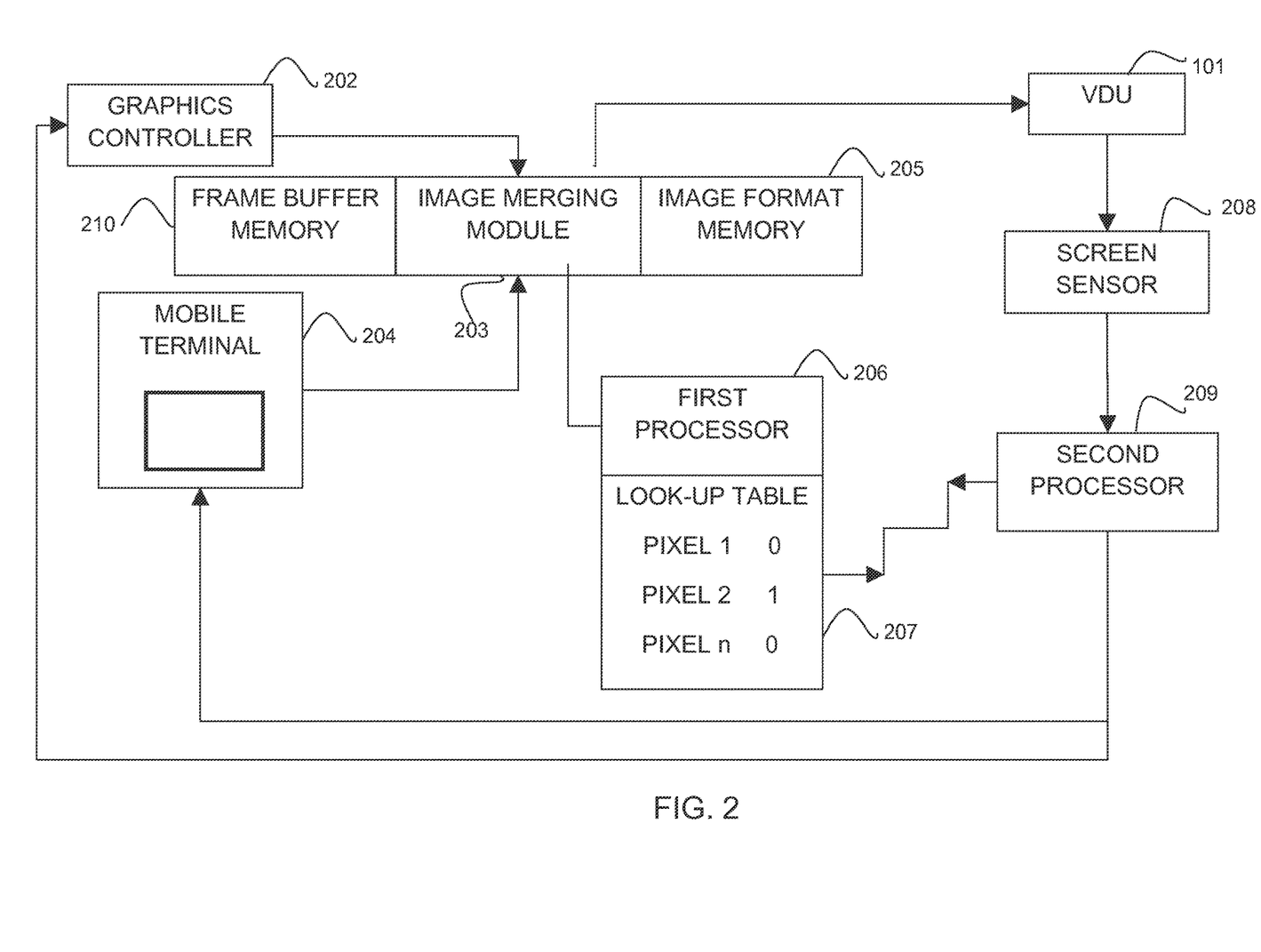
FIG. 2 is a simplified block diagram of an example of apparatus for identifying a content source of a visual display.

Referring now to FIG. 2 a graphics controller module 202 may be arranged to generate visual content for displaying to the occupants of the vehicle on the visual display unit 101. In one example, such visual content may be a graphical image comprising soft keys which may be used for selecting one of several radio stations for example. The graphical image may also comprise warning symbols to be displayed to the driver of the vehicle. The graphics controller module 202 may be operably coupled to an image merging module 203. The image merging module 203 may receive signals representing visual content from the graphics controller module 202 and also from a further visual content source which in this example is a mobile terminal 204. The mobile terminal 204 may, for example comprise a wireless communication unit such as a cell phone and may be operably coupled to the image merging module 203 in a wired or wireless manner. The image merging module 203 may be provided with an image format memory 205 whose function will be described below. An output of the image merging module 203 may be operably coupled to the visual display unit 101. A first processing module 206 may be operably coupled to the image merging module 203. The first processing module may include a memory which in this example may be a look-up table 207. The visual display unit 101 may be operably coupled to a screen sensor 208. An output of the screen sensor 208 may be operably coupled to a second processing module 209. The second processing module 209 may also be operably coupled to the look-up table 207 and to the mobile terminal 204 and the graphics controller module 202. The image merging module 203 may also be provided with a frame buffer memory 210.

In one example embodiment, apparatus for identifying a content source of a visual display may be arranged to merge images from two or more content sources, store a merging decision in a memory and route user inputs from the visual display accordingly.

The visual display unit 101 may be arranged to display images comprising a plurality of pixels and may be implemented using known display technologies including, for example, liquid-crystal displays, organic light emitting diodes, or flexible displays. The visual display unit may act as an input device as well as an output device. In one example, the visual display unit comprises a touchscreen and a user may select a particular region (comprising certain pixels) of an image displayed on the touchscreen (a soft key for example) by touching the selected region with a finger. The screen sensor 208 coupled to the visual display unit 101 may then be arranged to convert the pressure applied by the user's finger to an electrical signal and to generate a signal indicative of the pixels which have been selected. In another embodiment, the screen sensor 208 may comprise a proximity sensor which may be arranged to detect the presence of finger or other object which is being held close to the visual display unit 101 and to generate a signal indicative of the pixels which have been selected by virtue of the finger or pointer being held over a particular region of the display. Such display technologies are well known and will not be described herein in any great detail.

The mobile terminal 204 may be arranged to generate signals comprising graphical image content which may be displayed on a display (not shown) included in the mobile terminal itself. The mobile terminal 204 may include a display screen of the type which may act as an input device. In one example, the mobile terminal 204 may be arranged to respond in some predetermined way to an input signal which indicates a region of its screen which has been selected by a user.

In one embodiment, the visual display unit 101 comprises a touchscreen composed of a plurality of pixels on which may be displayed an image which comprises the merged images of visual content provided by the graphics controller 202 and the mobile terminal 204. A first predetermined set of pixels may display parts of the image produced by the graphics controller 202 and a second set of pixels may display certain parts of the image which has been generated by the mobile terminal 204. The merging of the images may be performed by the image merging module 203 in accordance with a predetermined format which may be stored in the image format memory 205. For example, in one example, the known technique of colour keying may be used and the image format memory may comprise a colour keying mask. In an example, a particular colour of the image received from one source, the graphics controller 202 for example, may be keyed out and wherever that colour occurs, it may be filled in by the image generated by the mobile terminal 204. As an alternative to colour keying, other known processes for merging two or more images supplied from two or more visual content sources may be employed. As a merging decision is saved in memory (for example the look up table 207) any merging technique may be used.

In one example, the frame buffer memory 210 may be arranged to store one or more frames (or full frames) of the images from the two sources, that is the graphics controller 202 and mobile terminal 204, in order to allow different update rates of the two images.

Figure 3:
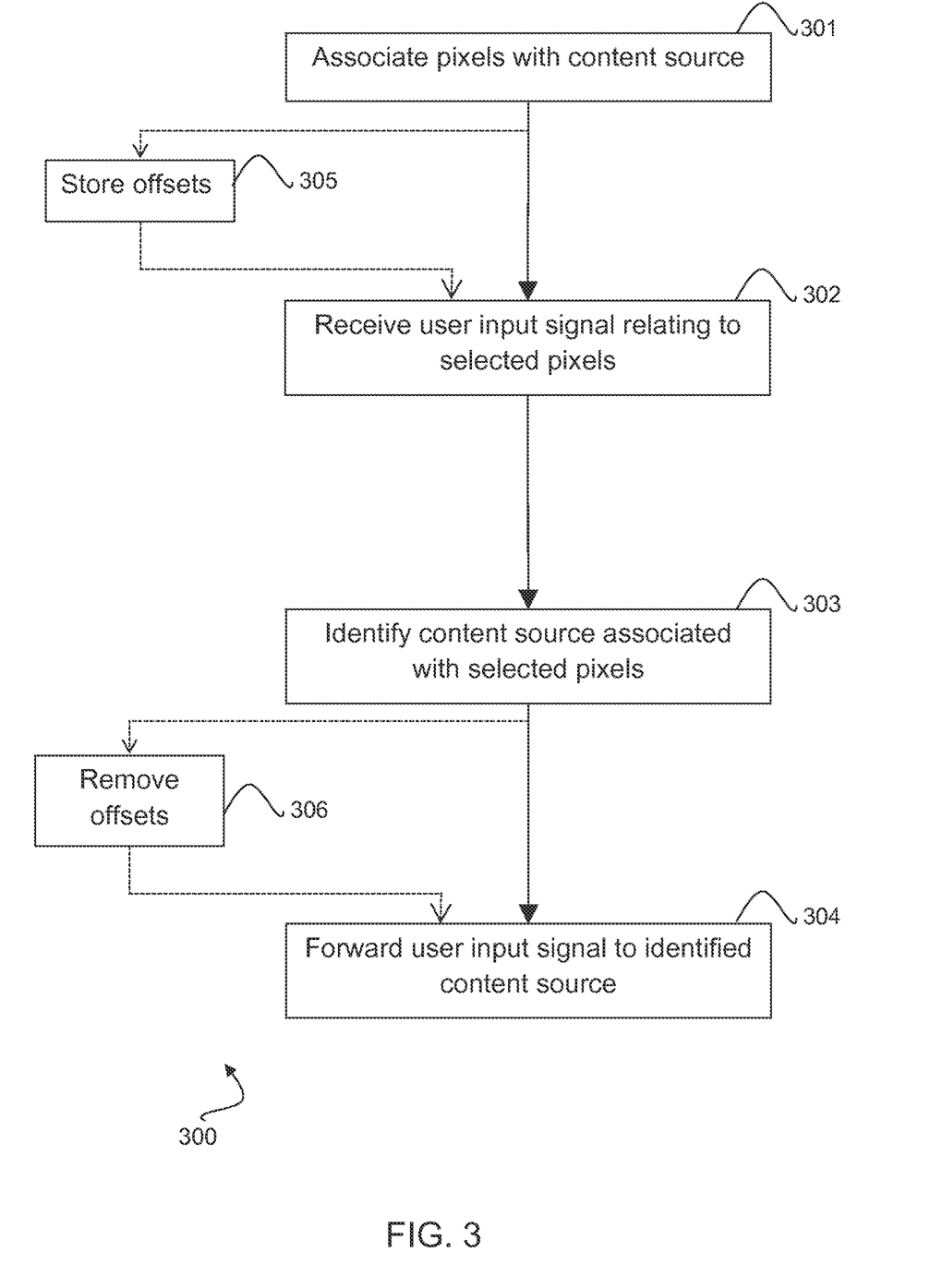
FIG. 3 is a simplified flowchart illustrating an example of a first method for identifying a content source of a visual display.

An example of a method 300 for identifying a visual display content source will now be described with reference to FIG. 3. At 301, of each pixel is associated with either one or another of two or more content sources. In the exemplary embodiment described above with reference to FIG. 2, two visual content sources are provided, namely, the graphics controller 202 and the mobile terminal 204. The process of associating each pixel with either the graphics controller 202 or the mobile terminal 204 is performed by the first processor 206. As the first processor 206 is operably coupled to the image merging module 203, the first processor is able to determine which content source provided the signal for activating any pixel of the visual display unit 101. The first processor 206 may then compile a list in the form of a lookup table 207, for example, which lists each pixel against a content source. This look at table 207 may be in the form of a mask whereby an identifier or a co-ordinate for each pixel is set either to "0" signifying the first source or "1" signifying the second source, for example.

While a merged image is displayed on the touchscreen, a user may wish to select a certain region of the touchscreen. The region may represent a soft key or a representation of a map which the user may wish to relocate or move by way of a touch and drag operation. The selected region will comprise a certain number of pixels. The screen sensor 208 may generate an electrical signal indicating which pixels have been selected by the user, that is, the location of the selected region with respect to some pre-defined touchscreen co-ordinates. At 302, a user input signal which has been generated by the screen sensor 208 and which relates to a selected one or more pixels may be received by the second processor 209. At 303 the second processor identifies which content source is associated with the selected pixels it may do this by interrogating the lookup table 207. At 304, the second processor 209 forwards the user input signal to the identified content source, namely either the graphics controller 202 or the mobile terminal 204. The identified content source may determine, using known techniques, from the user input signal, the region of the touchscreen which was selected by the user (a soft key for example).

Figure 4A:
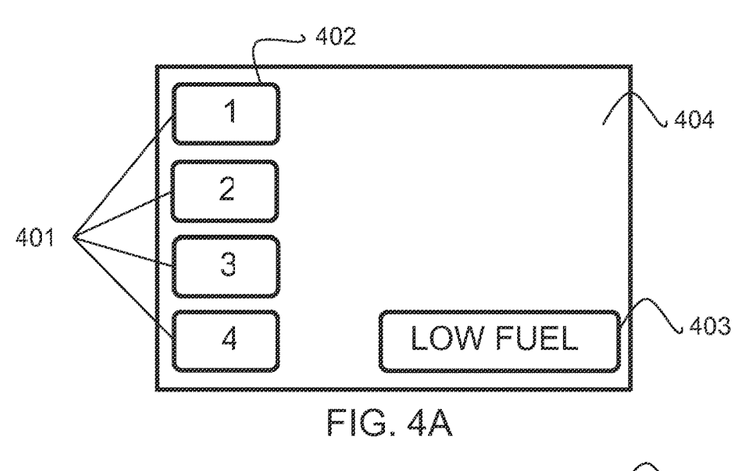
FIGS. 4A, 4B and 4C are simplified representations of displayed images according to a first embodiment.
Figure 4B:
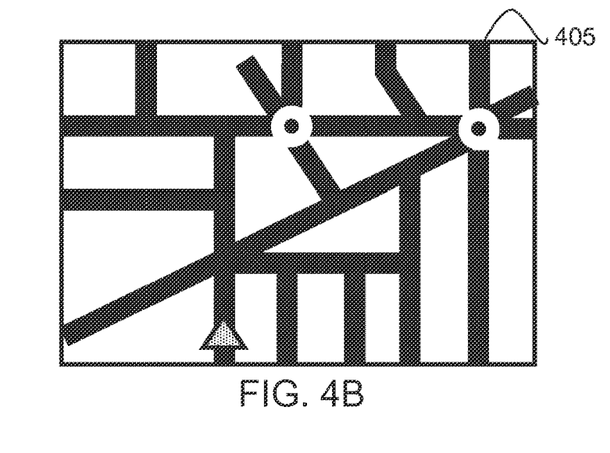
Figure 4C:
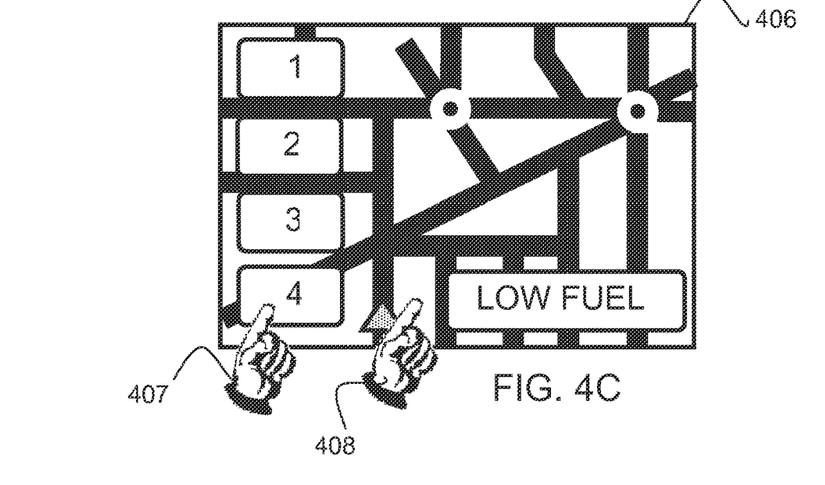

Referring now to FIGS. 4A, 4B and 4C; FIG. 4A is a simplified representation of an image which may be generated by the graphics controller 202, FIG. 4B is a simplified representation of an image which may be generated by the mobile terminal 204, and FIG. 4C is a simplified representation of parts of the image generated by the graphics controller 202 superimposed onto the image generated by the mobile terminal 204. That is, the image represented by FIG. 4C is the image appearing on the touchscreen and provided by the image merging module 293.

Say in the example of FIG. 4A, four soft keys 401 are displayed showing numbers from 1 to 4 in blue lettering on a white background 402. These softkeys 401 may relate to radio stations, for example, which the user may select by touching one of the softkeys. An orange-coloured rectangular warning panel 403 which may incorporate warning messages in blue font, "low fuel" for example may also be displayed. The rest of the display, ie the background 404 is black.

Say in the example of FIG. 4B, the image is a representation of a map 405 of the location of the vehicle 100. Such a map may be generated by the mobile terminal 204 using a Global Positioning System (GPS) program which may be included in the mobile terminal.

In this example, the image format memory 205 and image merging module 203 are arranged so that the any pixels comprising the image from the graphics controller module 202 which are black are keyed out (by colour keying) and filled in by the image provided by the mobile terminal 204. Thus the merged image 406 (see FIG. 4C) comprises the soft keys 401 and warning panel 403 superimposed onto the map 405. The first processor 206 may store in the look up table 207 the source of each pixel. For example, any pixel which was black in the graphics controller image 4A may be associated with the mobile terminal. All other colours will be associated with the graphics controller image.

Referring to FIG. 4C, if a user 407 wishes to select radio station number 4, for example, he touches the appropriate softkey 401. The screen sensor 208 may detect which pixels have been touched and send this information to the second processor 209 in a user input signal. From interrogation of the look up table 207 the second processor 209 will be able to determine that these selected pixels are associated with the graphics controller-generated image. The second processor 209 may then forward the user input signal to the graphics controller 202 which may respond to the user input in accordance with conventional techniques. If a user 408 wishes to scroll the map display 405 up or down, for example, he may initially touch the screen in a region of the map and then slide a finger along the screen to scroll the image. The screen sensor 208 may detect which pixels have been initially touched and send this information to the second processor 209 in a user input signal. From interrogation of the look up table 207 the second processor 209 will be able to determine that these selected pixels are associated with the map. The second processor 209 may then forward the user input signal to the mobile terminal 204 which may respond to the user input in accordance with conventional techniques. Other warning messages (not shown) may be superimposed over the map as long as they do not incorporate any black lettering or background.

Hence, the example embodiments may provide an apparatus and method which allows identification of the system which provided images for each pixel of a display screen which displays merged images of arbitrary shapes supplied from a plurality of systems. The example embodiments further allow routing of user inputs to the appropriate system for further processing.

Figure 5:
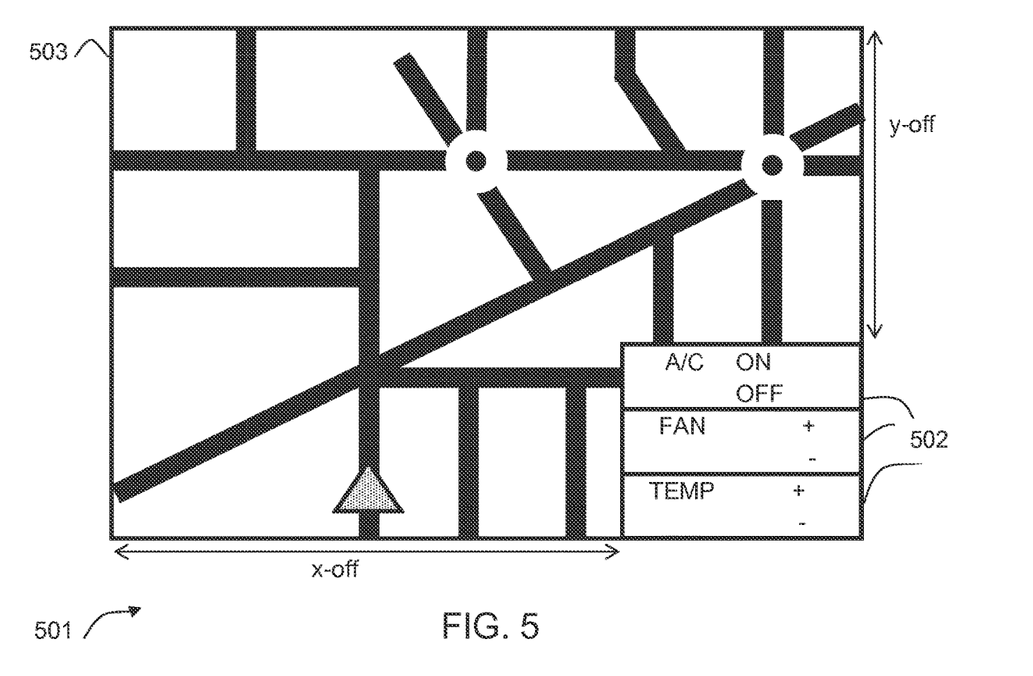
FIG. 5 is a simplified representation of a merged image according to a second embodiment.

In a further embodiment, FIG. 5 shows a merged image 501 wherein an image generated by one source may be merged by the image merging module 203 for example) with an image generated by another source but at a certain offset (x_off, y_off). In this example, softkeys 502 relating to a vehicle's HVAC system (heating, ventilation and air conditioning) are superimposed onto an image of a map 503 but offset with respect to co-ordinates of the touchscreen. In this embodiment, the method of FIG. 3 may additionally include storing, 305, offset co-ordinates (x_off, y_off) associated with an image generated by one of the content sources. Subsequent to identifying a content source associated with a selected pixel, at 306 the offset may be removed (by subtracting or adding x_off, y_off as the case may be) from/to the received user input signal.so that the correct x-y position of the touch point on the touchscreen is corrected to the original co-ordinate system of the second source. The first processor 206 may be arranged to store the offset values, in the look up table 207, for example. The second processor 209 may be arranged to remove stored offset values from a received user input signal. This option may allow keeping the sources completely independent of the final merging process. It may also allow extension of existing systems to support a merged configuration.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

As an example, a tangible computer program product may be provided having executable code stored therein to perform a method for identifying a content source of the visual display as disclosed herein.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims. For example, the visual display content source identifier may find application with displays other than those found in automotive vehicles. For example it may find application with displays used on laptop computers, tablets, mobile phones and other devices which use visual display systems which display images generated or supplied by more than one source. Furthermore, the invention is by no means limited to the use of the sources illustrated in the particular embodiments comprising the mobile phone display and a vehicle infotainment display. Also, the method used for merging two or more images need not be limited to colour keying. The formatting of the display and positioning of images from one or more sources on the display (that is, pixel by pixel) may be predefined and stored (in the image format memory associated with the image merging module of FIG. 2 for example).

The terms "front," "back," "top," "bottom," "over," "under" "left" and "right" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognise that the boundaries between logical blocks or modules are merely illustrative and that alternative embodiments may merge logic blocks or modules or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the first processor module and its associated memory comprising the lookup table of FIG. 2 may together comprise one module or separate modules. Similarly, the image merging module and its associated image format memory of FIG. 2 may both be implemented in a single module or may comprise separate modules. Further, the functionality of first processor and its associated memory and the second processor may be incorporated in a single module.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Further, the entire functionality of a visual display content source identifier according to the examples described herein may be implemented in an integrated circuit. Such an integrated circuit may be a package containing one or more dies. Alternatively, the examples may be implemented as any number of separate integrated circuits or separate devices interconnected with each other in a suitable manner. For example, an integrated circuit device may comprise one or more dies in a single package with electronic components provided on the dies that form the modules and which are connectable to other components outside the package through suitable connections such as pins of the package and bondwires between the pins and the dies.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method for identifying a visual display content source wherein a visual display comprises a plurality of pixels, the method comprising:
   detecting a selection of one of the plurality of pixels,
   storing offset coordinates associated with an image generated by one of a plurality of content sources for display on the visual display;
   receiving a user input signal relating to the selected one of the plurality of pixels, interrogating a look up table to determine a content source of the selected pixel;
   identifying a content source among the plurality of content sources as being associated with the selected pixel based on the interrogation of the look up table, wherein the look up table lists each pixel of the plurality of pixels, including the selected pixel, against its corresponding content source among the plurality of content sources, wherein the plurality of content sources comprise the content source being identified as being associated with the selected pixel,
   removing an offset from the user input signal; and
   forwarding the user input signal to the identified content source.

2. A tangible computer program product of claim 1 wherein the tangible computer program product comprises at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

3. The method of claim 1, further comprising:
   the visual display is a touch-sensitive screen and wherein the user input signal comprises a signal indicative of a user having touched said touch-sensitive screen at a particular location.

4. The method of claim 1, further comprising:
   merging, at an image merging module, images produced by a first and a second visual content source according to a predetermined format.

5. The method of claim 4, further comprising:
   merging, at the image merging module, images produced by the first and second visual content sources by using color keying.

6. The method of claim 4, further comprising:
   displaying the merged images on the visual display.

7. A visual display content source identifier wherein the visual display comprises a plurality of pixels, the identifier comprising:
   a first processor arranged to generate a list associating each pixel of the plurality of pixels with one or another of two or more content sources, the first processor including a memory for storing the list, the first processor further arranged to store offset coordinates associated with an image generated by one of the two or more content sources for display on the visual display,
   a screen sensor to detect a selection of one or more of the plurality of pixels, and
   a second processor arranged to receive a user input signal relating to the selected one or more of the plurality of pixels, the second processor further being arranged to identify, by interrogation of the list, which content source is associated with the selected pixels, arranged to remove an offset from the user input signal, and arranged to forward the user input signal to the identified content source.

8. The visual display content source identifier of claim 7 wherein the visual display is a touch-sensitive screen and wherein the user input signal comprises a signal indicative of a user having touched said touch-sensitive screen at a particular location.

9. The visual display content source identifier of claim 7 comprising an image merging module for merging images produced by a first and a second visual content source according to a predetermined format.

10. The visual display content source identifier of claim 9 wherein the image merging module is arranged to merge images produced by the first and second visual content sources by using colour keying.

11. The visual display content source identifier claim 7 comprising a frame buffer memory arranged to store at least one frame of an image generated by each content source.

12. The visual display content source identifier of claim 7 wherein the visual content source identifier is implemented in an integrated circuit device.

13. A vehicle comprising the visual display content source identifier of claim 7.

14. A method for comprising:
    associating each pixel of a plurality of pixels on a visual display with either one of first and second content sources;
    storing offset coordinates associated with an image generated by the one of the first and second content sources for display on the visual display; and
    generating a list associating each pixel of the plurality of pixels with one or another of the first and second content sources;
    detecting a selection of one or more of the plurality of pixels at a particular location on the visual display;
    generating a user input signal relating to the selected one or more of the plurality of pixels;
    identifying, by interrogation of the list, which content source is associated with the selected pixels;
    removing an offset from the user input signal; and
    forwarding the user input signal to the identified content source.

15. The method of claim 14, further comprising:
    merging, at an image merging module, images produced by a first and a second visual content source according to a predetermined format.

16. The method of claim 15, further comprising:
    merging, at the image merging module, images produced by the first and second visual content sources by using color keying.

17. The method of claim 16, further comprising:
    displaying the merged images on the visual display.

* * * * *